United States Patent
Wuensch et al.

[19]

[11] Patent Number: 5,349,754
[45] Date of Patent: Sep. 27, 1994

[54] POWER SAW WITH OPPOSITELY RECIPROCATING SAW BLADES

[75] Inventors: Steffen Wuensch, Holzgerlingen; Claus Kemmner, Aichtal-Neuenhaus; Karl-Heinz Braunbach, Leinfelden-Echterdingen; Vinzenz Haerle, Neckartenzlingen, all of Fed. Rep. of Germany

[73] Assignee: Robert Bosch GmbH, Stuttgart, Fed. Rep. of Germany

[21] Appl. No.: 987,441

[22] Filed: Dec. 7, 1992

[30] Foreign Application Priority Data

Dec. 7, 1991 [DE] Fed. Rep. of Germany ....... 4140395

[51] Int. Cl.$^5$ ..................... B23D 49/16; B23D 49/06
[52] U.S. Cl. ........................... 30/369; 30/392
[58] Field of Search ............... 30/350, 369, 355, 392, 30/383, 502; 83/821, 835, 839, 852

[56] References Cited

U.S. PATENT DOCUMENTS

| | | |
|---|---|---|
| 2,840,125 | 6/1958 | Kirksey . |
| 2,895,514 | 7/1959 | Wright . |
| 3,064,698 | 11/1962 | La Force . |
| 3,716,916 | 2/1973 | Alexander ........................ 30/369 |
| 4,133,236 | 1/1979 | Pearl ............................... 83/852 |
| 4,856,195 | 8/1989 | Grossmann et al. .............. 30/369 |
| 4,894,917 | 1/1990 | Nicolson .......................... 30/350 |
| 4,934,056 | 6/1990 | Leini ............................... 30/369 |
| 4,979,305 | 12/1990 | Leini ............................... 30/392 |
| 4,999,915 | 3/1991 | Jackson et al. ................... 30/369 |

FOREIGN PATENT DOCUMENTS 0267311 5/1988 European Pat. Off. .
2218376 11/1989 United Kingdom .

*Primary Examiner*—Richard K. Seidel
*Assistant Examiner*—Paul M. Heyrana, Sr.
*Attorney, Agent, or Firm*—Michael J. Striker

[57] ABSTRACT

A power saw has a sword having side walls which form a groove-shaped guide, and two parallel oppositely reciprocable saw blades having one longitudinal side provided with saw teeth and another longitudinal side provided with backs which are guided in the groove-shaped guide. The groove-shaped guide is interrupted by a plurality of recesses.

15 Claims, 6 Drawing Sheets

POWER SAW WITH OPPOSITELY RECIPROCATING SAW BLADES

BACKGROUND OF THE INVENTION

The present invention relates to a power saw with oppositely reciprocating saw blades.

The European patent document EP-A1 267311 discloses a power saw with a contour corresponding to the contour of a traditional fox-hand saw with trapezoidal saw blade. The fox-saw blade is however subdivided several times in the power saw. A trapezoidal supporting plate identified as a sword guides in its lower, groove-like region the back of the two reciprocating saw blades. The sword is composed of two trapezoidal sheet plates which are flatly mounted on one another and are laterally offset from one another so that a U-shaped groove is formed. Both saw blades are secured in this groove against falling out and guided narrowly near one another.

It has been recognized during their use that such saws have the disadvantage in the relatively high friction between the saw blades and the guide sword as well as a relatively bad chip withdrawal from the region of the cutting joint of the workpiece which is machined. This contributes to jamming of the accumulated chips in the region of the guides of the saw blades and the sword. This in turn leads to excessive warming up or overheating of the sword and the saw blades and is a cause of relatively low efficiency of the saw.

Moreover, the production of known swords is relatively expensive. The reason is that it involves different deformation and connection techniques which is of course undesirable.

SUMMARY OF THE INVENTION

Accordingly, it is an object of the present invention to provide a power saw which avoids the disadvantages of the prior art.

In keeping with these objects and with others which will become apparent hereinafter, one feature of the present invention resides, briefly stated, in a power saw having a sword which carries two parallel oppositely reciprocable saw blades guided in a groove-shaped guide of the plate-shaped sword, wherein in accordance with the present invention the groove-shaped guide is interrupted by recesses.

When the power saw is designed in accordance with the present invention, it has reduced friction, reduced thermal loading, and improved chip withdrawal and increased efficiency. Moreover, the sword can be produced with especially simply deformation process, and also can have a reduced weight, a reduced noise generation and especially high mechanical strength.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
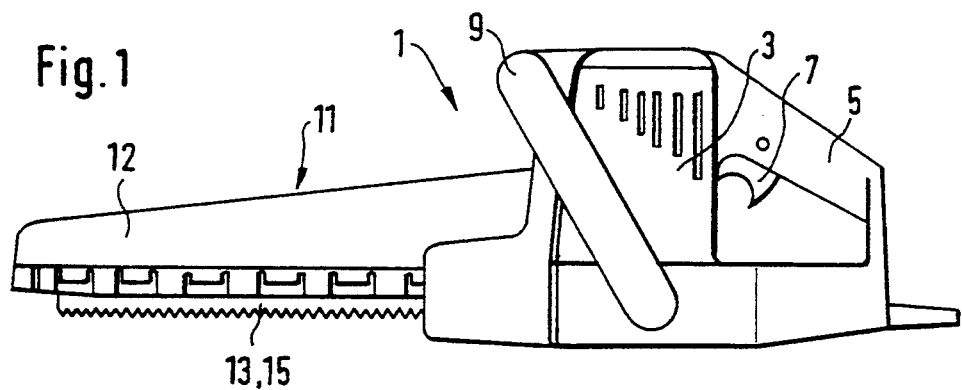
FIG. 1 is a side view of a power saw in accordance with the present invention.

A power saw shown in FIG. 1 is identified as a whole with reference numeral 1. It has a machine housing 3 with an operation handle 5, an on-off switch 7, an auxiliary handle 9, and a sword 11 connected with the machine housing 3. Two reciprocating saw blades 13 and 15 are guided in the sword 11.

When a not shown motor is started by actuating the on-off switch 7, the saw blades 13 and 15 are reciprocatingly moved in opposite directions at a small distance from one another. Sawing is performed by pressing the saw against a workpiece in direction perpendicular to the direction of the movement of its saw blades 13 and 15. The saw feed within some limits, depends on the force of the operator applied perpendicular to the direction of movement of the saw blades 13 and 15.

Figure 2:
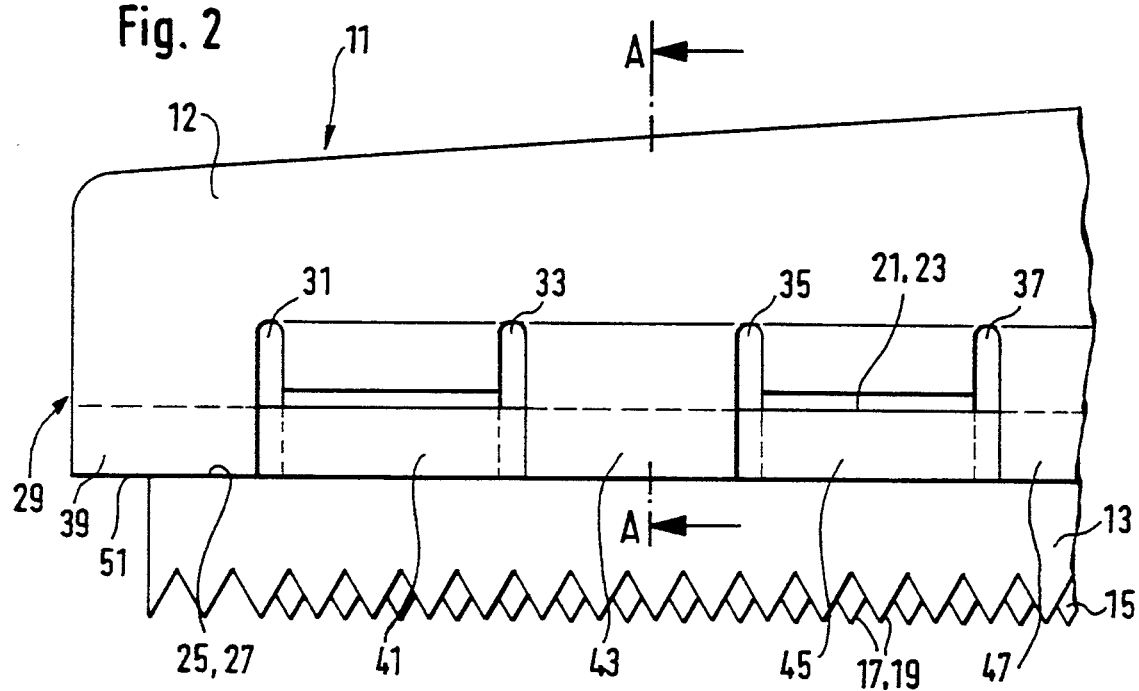
FIG. 2 is a side view of a sword and a saw blade of FIG. 1 on an enlarged scale.

As can be seen from FIG. 2 which shows the front part of the sword 11 with the saw blades 13 and 15, each saw blade has a region which carries saw teeth 17 and 19. The saws are provided with backs 21 and 23 which are located at opposite sides of the saw teeth 17 and 19. They also have backs 21 and 23 located at the opposite sides of the saw teeth 17 and 19, as well as lateral shoulders 25 and 27.

The saw blades 13 and 15 are guided in a groove-shaped profile 29 of the sword 11 by the backs 21 and 23 of the saw blades.

The profile 29 is produced by punch bending treatment of the sword 11 in the following manner: A row of slot-shaped recesses 31, 33, 35, 37 having the same sizes are made in the lower region of the sword 11 normal to the sword axis at the same height. The recesses subdivide the lower region of the sword 11 in a saw tooth-like fashion into a raw of rectangular tabs 39, 41, 43, 45, 47. The tabs 39, 41, 43, 45, 47 are offset alternatingly at opposite sides at the same distance with respect to the central plane of the sword. Thereby the side walls 38, 40, as considered in the longitudinal direction of the sword 11, are alternatingly laterally interrupted. The size of the respective open lateral region of the side walls 38, 40 corresponds respectively to the width of the tabs 39–41 with the addition of the width of two recesses 31–37. The sword 11 is supported with each lower edge 51 which is interrupted by the laterally open region, against the shoulders 25, 27 of the saw blades 13, 15.

Figure 3:
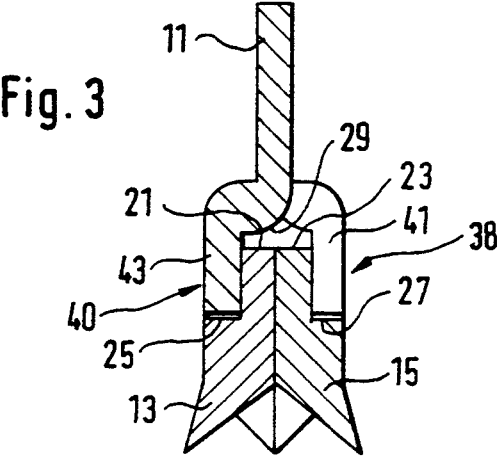
FIG. 3 is a view showing a detail of the inventive power saw in a section taken in FIG. 2.
Figure 3A:
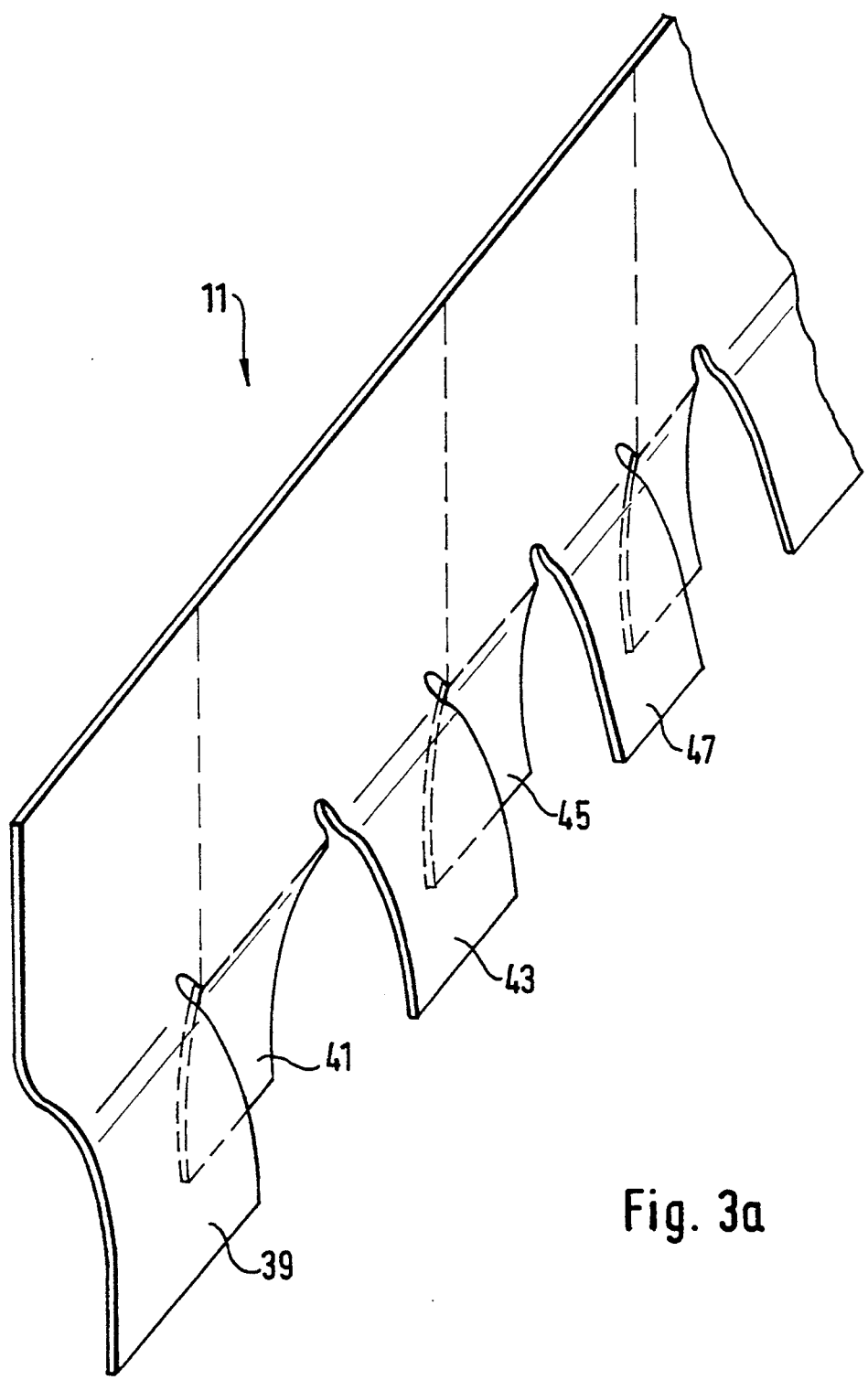
FIG. 3a is a perspective view of the sword of FIG. 2.

The section of the sword 11 in the region of the tab 43 shown in FIG. 3 and the perspective view of FIG. 3a illustrate the design of the sword 11 with the tabs 41, 43 offset at opposite sides to form the groove-shaped profile 29 extending in the longitudinal direction of the sword 11. It can be seen that the alternatingly offset tabs 41, 43 produce window-like open side wall regions in the groove-shaped profile 29.

Figure 4:
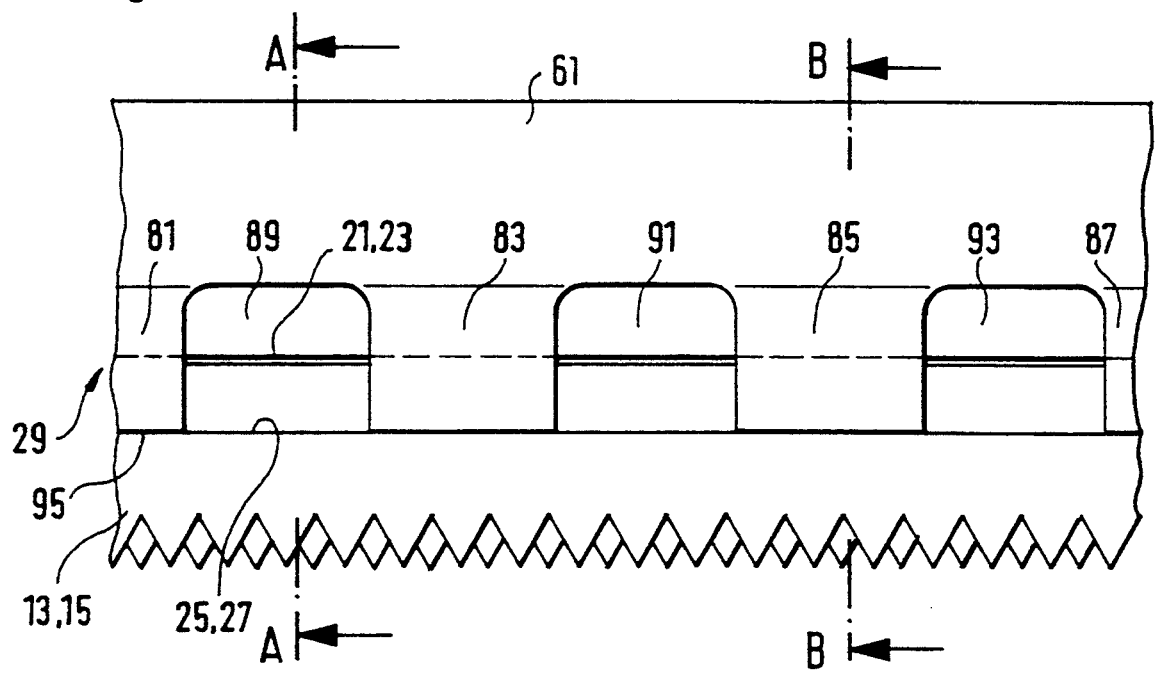
FIG. 4 is a view showing a further embodiment of the power saw of the invention.

FIG. 4 shows a further embodiment of a sword 61 of the inventive power saw. It is suitable for the use with the saw shown in FIG. 1. The sword 61 is formed by two seat-shaped plates which are flatly glued or welded with one another. The sword 61 has a regular, rectangular design, and has, as in the embodiment of FIG. 2, a groove-shaped profile 79. The profile 79 has a saw teeth-shaped design as shown from the side. Rectangular tabs 81, 83, 85, 87 have the same size and are spaced from one another by recesses 89, 91, 93 arranged in a row one after the other.

The saw blades 13 and 15 similarly to FIGS. 1 and 2 are supported in the sword 61 so that they cannot be lost. The saw blades 13 and 15 are secured with their backs 21 and 23 in the nut shaped profile 79 by not shown means from going out, and are guided closely to one another. A lower edge 93 of the sword 61 is interrupted by recesses 89–91 and abuts against the shoulders 25, 27 of the saw blades 13, 15.

Figure 5:
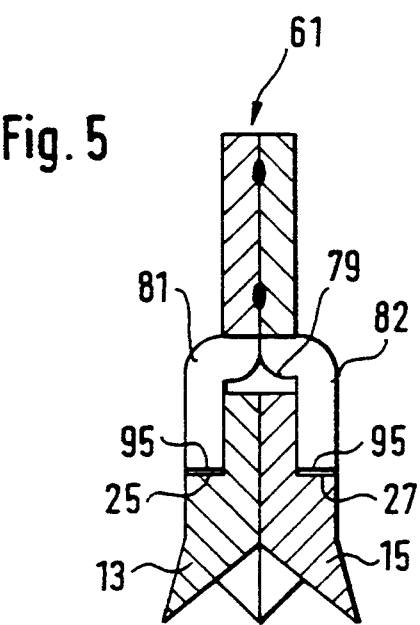
FIGS. 5 and 6 are views showing sections of the power saw of FIG. 4.
Figure 6:
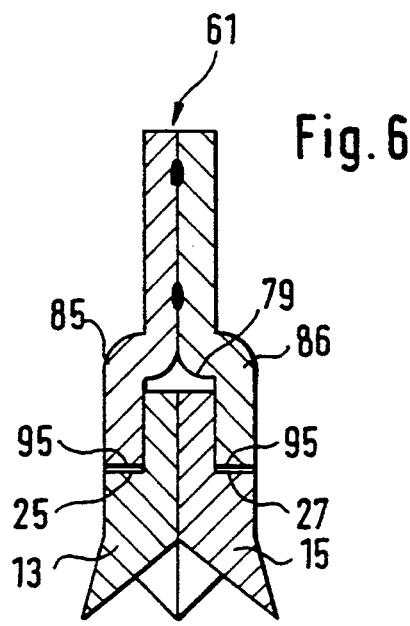

FIGS. 5 and 6 show the sections taken through the tab 85 or through the recess 89. They illustrate clearly the arrangement of the plates in pairs for forming the sword 61, as well as the openings 87–93 arranged in pairs opposite to one another as well as the tabs 81–87 arranged in pairs opposite to one another as well. The groove-like shape of the lower portion of the sword 61 with the recesses 89–93 is especially favorable for the chip withdrawal with low friction and good cooling.

Figure 7:
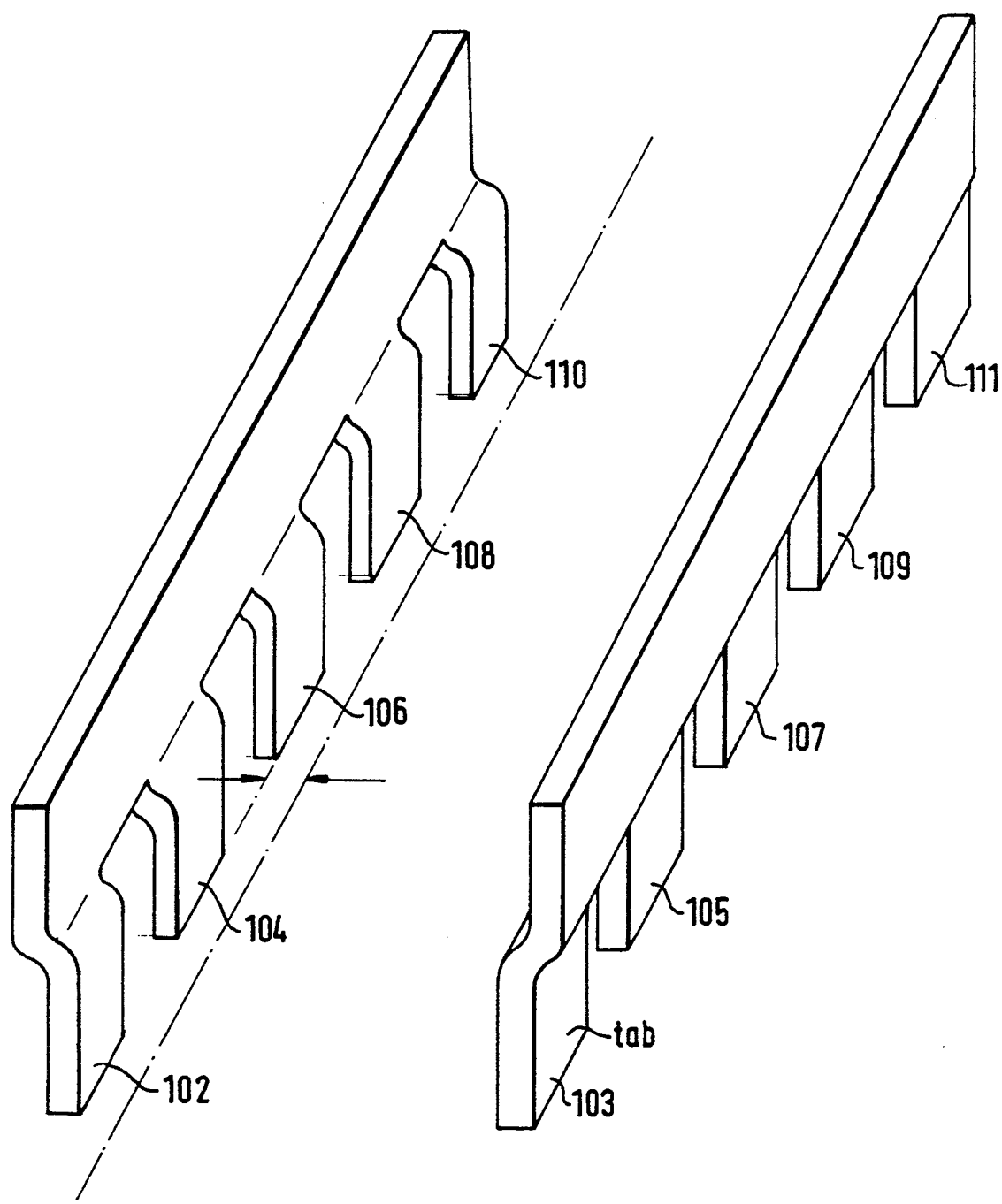
FIG. 7 is a perspective view of single plates of the sword of still a further embodiment of the power saw of the invention.
Figure 8:
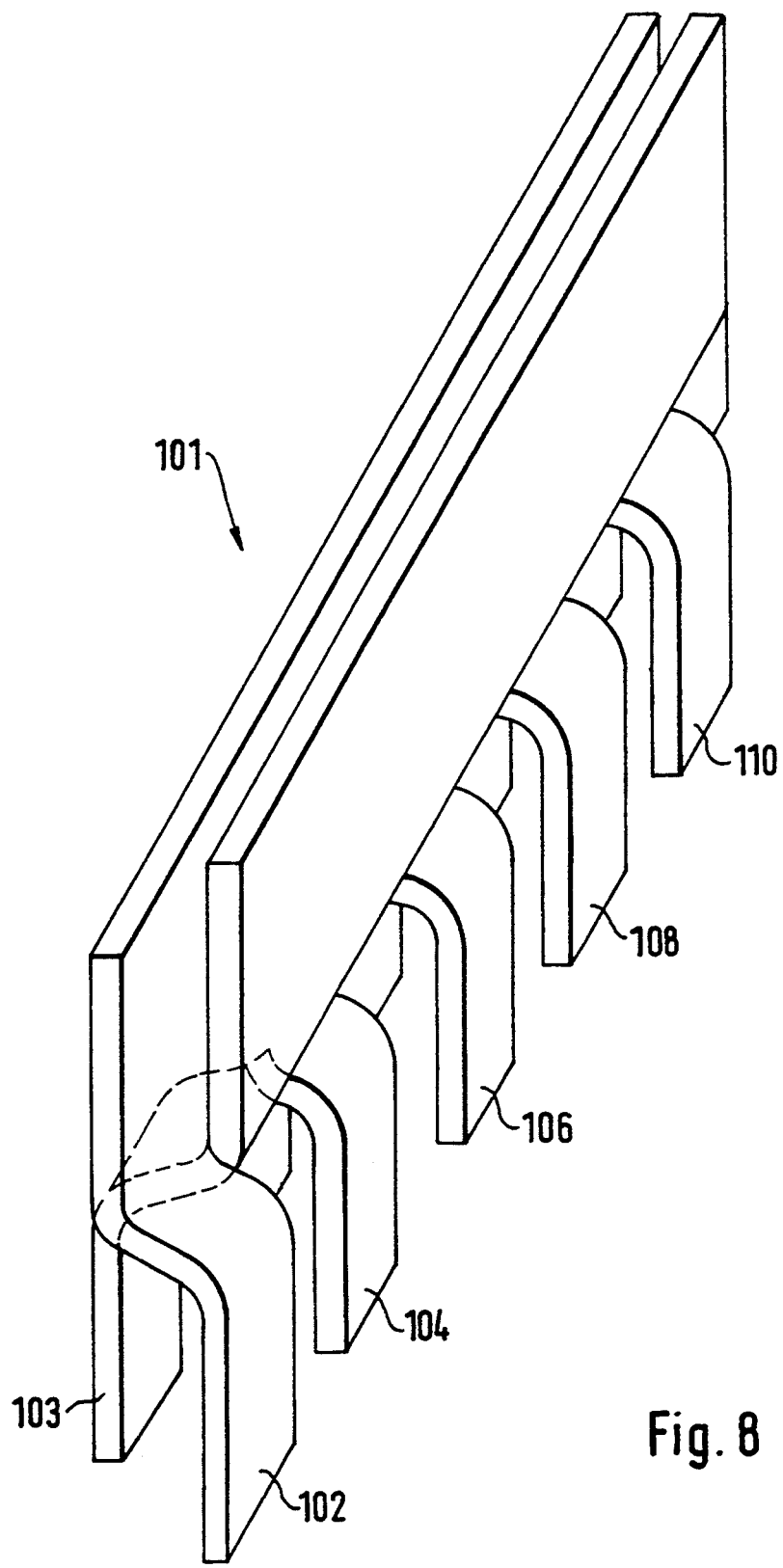
FIG. 8 is a perspective view of the sword of FIG. 6.

As can be seen from FIGS. 7 and 8, which illustrate another embodiment of the invention, the sword 101 is also composed of two plates. One sword plate has a plurality of tabs 102, 104, 106, 108, 110 and the other of the plates has a plurality of tabs 103, 105, 107, 109, 111. Recesses are provided between the tabs of each of the plates. The tabs of one plate and the tabs of the other plate are offset in opposite directions. In the assembled position shown in FIG. 8, the tabs of one plate engage into the recesses of the other plate frictionally and form the groove-shaped guide for the saw blades.

Figure 9:
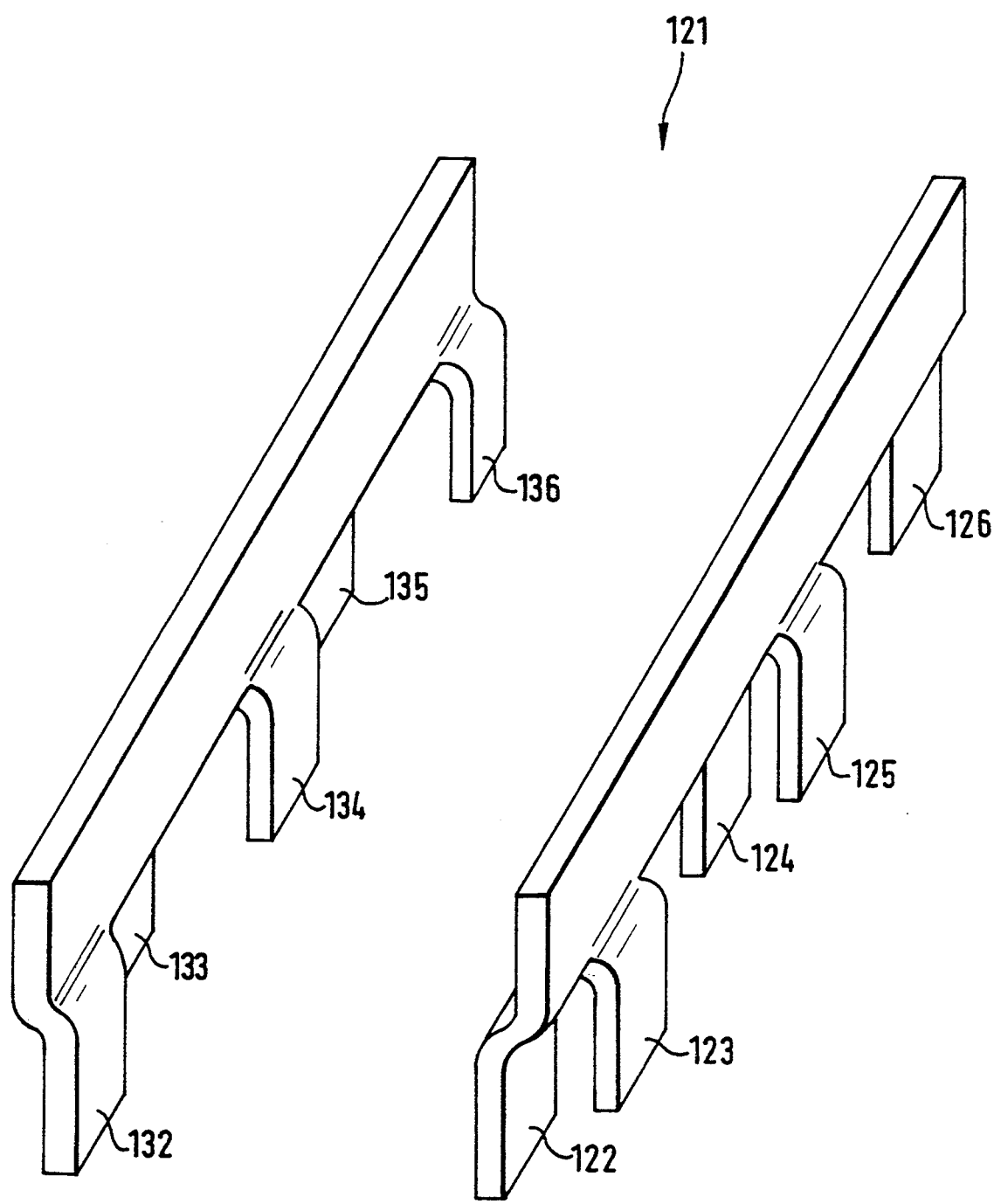
FIG. 9 is a perspective view of single plates of the sword of still another embodiment of the power saw of the invention.

The sword 121 shown in FIG. 9 also has two sword plates. One of the plates has tabs 122, 123, 124, 125, 126, while the other plate has tabs 132, 133, 134, 135, 136. The tabs of each plate are alternatingly offset relative to one another in opposite directions by a distance corresponding to a width of the groove-shaped guide for the saw blades. The recesses between the pairs of tabs in each of the plates have a width corresponding to a double width of the tabs. When the plates are assembled with one another, the tabs of one plate engage in the recesses of the other plate, and a groove-shaped guide is formed between the tabs of the plates.

In accordance with a further not shown embodiment of the invention, the sword can be designed as described hereinabove, but so that alternatingly each second tab is dispensed with. In this manner a further weight saving of the sword and better chip withdrawal openings are produced.

It will be understood that each of the elements described above, or two or more together, may also find a useful application in other types of constructions differing from the types described above.

While the invention has been illustrated and described as embodied in a power saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A power saw, comprising an elongated sword having side walls which form a groove-shaped guide extending in direction of elongation of said sword; and two parallel oppositely reciprocable saw blades having one longitudinal side provided with saw teeth and another longitudinal side provided with backs which are guided in said groove-shaped guide, said groove-shaped guide being interrupted substantially in a region of said backs of said saw blades by a plurality of recesses extending transversely to said direction of elongation of said sword and spaced from one another in said direction of elongation of said sword.

2. A power saw as defined in claim 1, wherein said sword is formed as a metal sheet.

3. A power saw as defined in claim 1, wherein said groove-shaped guide is formed as a punched guide in said plate.

4. A power saw as defined in claim 1, wherein said groove-shaped guide is formed as a bent guide in said plate.

5. A power saw as defined in claim 1, wherein said side walls of said groove-shaped guide are formed by a plurality of tabs.

6. A power saw as defined in claim 5, wherein said tabs are arranged in a row one after the other and have a rectangular shape.

7. A power saw as defined in claim 5, wherein said tabs have a predetermined width, said recesses having a width which is at least equal to the width of said tabs.

8. A power saw as defined in claim 5, wherein said tabs are alternatingly offset to opposite sides.

9. A power saw as defined in claim 8, wherein said tabs are offset at a right angle.

10. A power saw as defined in claim 1, wherein said sword is composed of two plates, said walls being formed in each of said plates by a plurality of tabs alternating with said recesses, said tabs of one of said plates engaging into said recesses of another of said plates frictionally so as to form said groove-shaped guide.

11. A power saw as defined in claim 1, wherein said sword is composed of two plates, said side walls being formed in each of said plates by a plurality of tabs alternating with said recesses and alternatingly offset in opposite directions, said recesses having a width corresponding to a double tab width, said tabs of one of said plates engaging into said recesses of another of said plates and being arranged with respect to one another at a distance corresponding to a width of said groove-shaped guide.

12. A power saw as defined in claim 11, wherein said tabs of said plates are arranged straight with respect to one another.

13. A power saw as defined in claim 11, wherein said tabs of said plates are offset relative to one another.

14. A power saw as defined in claim 1, wherein said sword has a trapezoidal shape.

15. A power saw, comprising a sword composed of a single blade having side walls and a lower region forming a groove-shaped guide; and two parallel oppositely reciprocable saw blades having one longitudinal side provided with saw teeth and another longitudinal side provided with backs which are guided in said groove-shaped guide, said groove-shaped guide being interrupted by a plurality of recesses substantially in a region of said backs of said saw blades.

* * * * *